Patented Oct. 8, 1935

2,016,403

UNITED STATES PATENT OFFICE 2,016,403

TREATMENT OF RUBBER

William F. Tuley, Nutley, N. J., assignor to Morgan & Wright, Detroit, Mich., a corporation of Michigan No Drawing. Application August 11, 1932,
Serial No. 628,297

7 Claims. (Cl. 106—23)

This invention relates to improvements in the treatment of rubber and particularly to improvements in the plastication of rubber and rubber-like materials.

An object of this invention is to provide a method of increasing the rate of breakdown of crude rubber during mastication by means of the usual masticating machinery. Another object is to provide a process whereby a softer broken down rubber may be produced in a given time by mastication than is possible under the usual conditions for mastication. Another object is to provide a process of breaking down crude rubber whereby substantial savings in time, labor, power consumption, and equipment costs may be realized. A further object is to provide a process whereby the output of a given masticating equipment may be substantially increased. A still further object is to provide a softened or broken-down crude rubber having desirable physical properties. Other objects will be apparent from the following description.

It is customary to plasticize crude rubber on a roll mill or in an internal grinder before mixing in the compounding ingredients, such as fillers, pigments, and vulcanizing ingredients such as accelerators, sulphur, etc. The operation normally requires from 30–40 min. to several hours, depending on the softness desired, and is carried out either continuously, or intermittently with intervening rest periods. So called "softeners" such as fatty acids, oils, and tars, usually considered indispensible in factory compounding, when added to crude rubber on the mill actually decrease the degree of breakdown which can be produced in a given length of time, and in many cases, such as tire tread stocks, it has been found that oils such as palm oil and pine tar, produce decreased resistance to abrasion of the vulcanized tread. The main purpose of such "softeners" is to facilitate the incorporation of dry fillers, and to facilitate subsequent calendering or tubing operations, by virtue of their lubricating properties. Further, rubber broken down in the usual manner and compounded with fillers and oils etc. tends to harden upon standing and hence in many cases is "cracked" or broken down a second time before further processing. This hardening effect is due to the thixotropic nature of the mass and is distinct from the hardening due to cooling of the rubber. Thixotropic hardening of the rubber stock is substantially avoided by the present invention.

Accordingly the invention broadly comprises treating crude rubber during the preliminary breakdown or masticating period with certain organic oxygen compounds which act as reagents to increase the rate of breakdown of the rubber, said treatment being carried out prior to the incorporation of the usual compounding and/or vulcanizing ingredients.

Examples of such reagents are organic peroxides which are relatively stable in the presence of rubber at milling temperatures, that is, organic peroxides having a controllable reactivity under such conditions, such as benzoyl peroxide and its substituted derivatives, phthalyl peroxide, cinnamyl peroxide, acetone peroxide, etc. Among such organic peroxides, the aromatic acyl peroxides are particularly effective.

Any of the reagents or mixture of them is added to the rubber, substantially as soon as it has been masticated to a coherent mass or sheet, which condition is usually reached after a few minutes of preliminary mastication. Mastication is continued after adding the reagent or reagents, or the further mastication may be delayed until further processing of the rubber is desired. Generally, the compounding and/or vulcanizing ingredients should not be added until the rubber has reached the desired degree of softness. Certain materials tend to destroy the plasticizing powers of the reagents, and should not be added to the rubber during the breakdown; for example, carbon black destroys the activity of benzoyl peroxide.

The reagents may be used in various amounts but it is preferred to use them in quantities from about 0.25% to about 1.0% of the weight of rubber used. Larger amounts of the reagents may be used, but it may be stated that larger amounts cause transitory stiffening effects on the rubber, and the vulcanization and ageing may be unfavorably affected.

The preferred temperature range at which the rubber is treated is the range commonly employed in the breaking down of rubber, that is, from about 140° to about 200° F., although higher temperatures may be used, if desired, for example temperatures as high at 260° F. have been used with satisfactory results. The effects of the process are less noticeable when the process is carried out with the temperature of the rubber much below 160° F.

In order to obtain the benefits of the invention, such as reduced power demands, to the fullest degree, it is preferable also to carry out the preliminary working of the rubber, prior to the incorporation of the breakdown-accelerating reagent, on or in a preheated mill rather than to start with a "cold" mill.

Under the conditions of the present process, the reagents decompose during the plasticizing process, and substantially no undecomposed reagent is present during the subsequent operations of compounding and vulcanizing. For example, the decomposed benzoyl peroxide is recoverable in the form of benzoic acid.

The plasticities as given in the examples below represent the relative viscosities of the respective rubber samples and were determined by measuring the relative resistance of the samples to simple shearing stress at a constant average rate of shear and at a temperature of 212° F.

*Example 1.*—A quantity of smoked sheet was blended by milling for 3 min. and then divided into 600-gram portions. As a control, one such portion was then milled for 8 min. at 200° F. without the addition of any reagent. To the other portion benzoyl peroxide was added as indicated in Table I, and the treated portion was then milled for 8 min. at 200° F. Samples of each of the portions were taken just prior to and also at the completion of the 8 min. milling period, and the plasticity of each sample was determined. The results are given in Table I:

*Table I*

| Chemical reagent | Percent of rubber | Plasticity | | Percent decrease in viscosity |
|---|---|---|---|---|
| | | Initial | After 8 min. milling at 200° F. | |
| A. None | | | 71.5 | 70.5 | 1.4 |
| B. Benzoyl peroxide<br>Naphthalene<br>(eutectic mixture) | 0.25<br>0.355 | 71.5 | 59.0 | 17.5 |

It is obvious from the above data that the treated portion B underwent a very substantial softening during a period of time in which the plasticity of the control portion A remained practically constant.

*Example 2.*—A quantity of unbroken-down smoked sheets was blended on a cold mill for 3 minutes, after which the plasticity of a representative sample of the rubber was found to be 71.0. To six 400-gram portions of this rubber were then added, respectively, reagents as shown in Table II, and the portions were then milled for 8 minutes at 200° F. Another portion was milled under the same conditions, as a control without the addition of any reagent. The plasticities measured immediately after the milling are given in Table II.

*Table II*

| Reagent | Percent on rubber | Plasticity after 8 min. milling at 200° F. |
|---|---|---|
| A. None | | 66 |
| B. m,m'-dinitrodibenzoyl peroxide | 0.5 | 57.5 |
| C. m,m'-dichlorodibenzoyl peroxide | 0.45 | 54 |
| D. Dicinnamyl peroxide | 0.5 | 57.5 |
| E. p,p'-dinitrodibenzoyl peroxide | 0.5 | 54 |
| F. Benzoyl peroxide (powdered to pass a 200 mesh screen) | 0.5 | 51.5 |
| G. Benzoyl peroxide<br>Naphthalene | 0.5<br>0.75 | 52 |

It is seen that each of the above reagents effected a substantial increase in the rate of breakdown of the rubber as compared with the control.

*Example 3.*—Two hundred pounds of pale crepe was divided into six equal portions and broken down for 3 minutes on a 30-inch mill. These portions were then combined into two lots by taking one-half of each of the six batches which had been broken down and blending. To the first lot (A) was added an amount of the eutectic mixture of benzoyl peroxide and naphthalene containing an amount of benzoyl peroxide equal to 0.25 percent of the weight of the rubber and an amount of naphthalene equal to 0.375 of the weight of the rubber; the second lot (B) was used as a control. Each of these lots was then milled for 30 minutes on a 30-inch mill with the rolls at a temperature of 150° C. at the start of the milling. The pasticity measurements made at 6-minute intervals during the 30 minutes of milling are shown in Table III.

*Table III*

| Minutes on mill | A | B |
|---|---|---|
| | Benzoyl peroxide 0.25%<br>Naphthalene 0.375% | Control |
| | Plasticity | |
| 0 | 79 | 79 |
| 6 | 75.5 | 74 |
| 12 | 71.0 | 70.5 |
| 18 | 68.5 | 72.0 |
| 24 | 64.5 | 71.5 |
| 30 | 62.5 | 70.5 |

After the stocks had been stored for four days it was observed that stock A was still soft, while stock B had become substantially as hard as it was before the milling.

In order to obtain satisfactory dispersion of the reagents in the rubber they may be added in finely pulverized form, or they may be added as solutions or as dispersions in suitable liquids. A more convenient method of incorporating such as benzoyl peroxide consists in the use of a mixture of the same with any suitable diluent for the purpose of lowering the melting point of the peroxide. In Examples I, II and III above is illustrated the use of a mixture of benzoyl peroxide and naphthalene having approximately the composition of the eutectic mixture (the latter consisting of 59% of naphthalene and 41% of benzoyl peroxide, and having a melting point of about 61° C.). The mixture used melted at 63–64° C. and becomes liquid when added to the hot rubber on the mill and readily fluxes into the rubber.

Further examples of organic peroxides which fall within the scope of the invention are perbenzoic acid which, being a mixed peroxide of hydrogen and benzoyl, is considered an aromatic acyl peroxide; peroxides of halogenated fatty acids, particularly those of chlorinated higher or soap-forming fatty acids; and aromatic aldehyde peroxides such as those of benzaldehyde, for example di-benzal di-peroxide. Alkyl peroxides, aliphatic acyl peroxides, and aliphatic aldehyde peroxides on the other hand are examples of organic peroxides which are so explosive and self-oxidizing that they may be said to have uncontrollable reactivity under the conditions existing on a rubber-mixing mill, and do not fall within the scope of the invention.

The invention is applicable to all commercial types of crude rubber, and is particularly advantageous in the treatment of the higher grades of rubber, such as fine para, crepes, smoked sheets, spray dried rubbers, etc.

With the detailed disclosure above given, it is obvious modifications will suggest themselves, without departing from the principle of the invention, and it is not desired to limit the invention otherwise than as set forth in the appended claims.

Having thus described my invention, what I claim and desire to protect by Letters Patent is:

1. A process of breaking down crude rubber prior to the addition of compounding and/or vulcanizing ingredients which comprises adding to the crude rubber a relatively stable acyl peroxide in an amount sufficient to reduce the viscosity of the rubber and milling the rubber for a time and at a temperature sufficient to produce a decrease in viscosity.

2. A process of breaking down crude rubber prior to the addition of compounding and/or vulcanizing ingredients which comprises adding to the crude rubber an aromatic acyl peroxide in an amount sufficient to reduce the viscosity of the rubber and milling the rubber for a time and at a temperature sufficient to produce a decrease in viscosity.

3. A process of breaking down crude rubber prior to the addition of compounding and/or vulcanizing ingredients which comprises adding to the crude rubber acetone peroxide in an amount sufficient to reduce the viscosity of the rubber and milling the rubber for a time and at a temperature sufficient to produce a decrease in viscosity.

4. A process of breaking down crude rubber prior to the addition of compounding and/or vulcanizing ingredients which comprises adding to the crude rubber benzoyl peroxide in an amount sufficient to reduce the viscosity of the rubber and milling the rubber for a time and at a temperature sufficient to produce a decrease in viscosity.

5. A process of breaking down crude rubber prior to the addition of compounding and/or vulcanizing ingredients which comprises adding to the crude rubber a mixture of benzoyl peroxide and a diluent to lower the melting point thereof in an amount sufficient to reduce the viscosity of the rubber and milling the rubber for a time at a temperature sufficient to produce a decrease in viscosity.

6. A process of breaking down crude rubber prior to the addition of compounding and/or vulcanizing ingredients which comprises adding to the crude rubber a eutectic mixture of benzoyl peroxide and naphthalene in an amount sufficient to reduce the viscosity of the rubber and milling the rubber for a time and at a temperature sufficient to produce a decrease in viscosity.

7. A process of breaking down crude rubber prior to the addition of compounding and/or vulcanizing ingredients which comprises adding to the crude rubber from about 0.25 to about 1 percent by weight based on the rubber of an aromatic acyl peroxide which is relatively stable in the presence of rubber at milling temperatures and milling the rubber at a temperature of at least about 140° F. for a time sufficient to produce a decrease in viscosity.

WILLIAM F. TULEY.

CERTIFICATE OF CORRECTION.

October 8, 1935.

Patent No. 2,016,403.

WILLIAM F. TULEY.

It is hereby certified that the above numbered patent was erroneously issued to "Morgan & Wright, of Detroit, Michigan, a corporation of Michigan, whereas said patent should have been issued to United States Rubber Company, New York, N. Y., a corporation of New Jersey, as assignee by mesne assignments of the entire interest in said invention, as shown by the records of assignments in this office; and that the said Letters Patent should be read with this correction therein that the same may conform to the record of the case in the Patent Office.

Signed and sealed this 19th day of November, A. D. 1935.

Leslie Frazer

Acting Commissioner of Patents.

(Seal)